(12) United States Patent
Son et al.

(10) Patent No.: US 8,211,582 B2
(45) Date of Patent: Jul. 3, 2012

(54) FUEL CELL SYSTEM

(75) Inventors: Inhyuk Son, Yongin-si (KR); Dongmyung Suh, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 611 days.

(21) Appl. No.: 12/230,789

(22) Filed: Sep. 4, 2008

(65) Prior Publication Data

US 2009/0075153 A1    Mar. 19, 2009

(30) Foreign Application Priority Data

Sep. 13, 2007 (KR) .................. 10-2007-0093277

(51) Int. Cl.
*H01M 8/04* (2006.01)
*H01M 8/24* (2006.01)
*H01M 2/38* (2006.01)
*H01M 2/40* (2006.01)
*H01M 2/08* (2006.01)
*H01M 8/10* (2006.01)

(52) U.S. Cl. ........ 429/447; 429/443; 429/452; 429/454; 429/455; 429/456; 429/457; 429/458; 429/460; 429/462; 429/465; 429/463

(58) Field of Classification Search .............. 429/34, 429/413, 416, 423, 431, 443, 447, 452, 454, 429/455–458, 460, 462, 463, 465
See application file for complete search history.

(56) References Cited

U.S. PATENT DOCUMENTS

| | | | |
|---|---|---|---|
| 2007/0042257 A1* | 2/2007 | Chyou et al. | 429/38 |
| 2007/0072052 A1* | 3/2007 | An et al. | 429/38 |
| 2007/0122672 A1* | 5/2007 | Kweon et al. | 429/30 |
| 2007/0154761 A1* | 7/2007 | Eun et al. | 429/32 |
| 2008/0057377 A1* | 3/2008 | Chang et al. | 429/39 |

FOREIGN PATENT DOCUMENTS

| | | |
|---|---|---|
| JP | 08213044 | 8/1996 |
| JP | 2002280024 | 9/2002 |
| KR | 1020040099899 A | 12/2004 |
| KR | 10-0486562 B1 | 5/2005 |
| KR | 100531817 B1 | 11/2005 |
| KR | 1020050103998 A | 11/2005 |
| KR | 1020050122768 A | 12/2005 |
| KR | 1020060078360 A | 7/2006 |
| KR | 100649219 B1 | 11/2006 |
| KR | 1020070042654 A | 4/2007 |
| KR | 1020080076206 A | 8/2008 |

* cited by examiner

*Primary Examiner* — Basia Ridley
*Assistant Examiner* — Sean P Cullen
(74) *Attorney, Agent, or Firm* — Robert E. Bushnell, Esq.

(57) ABSTRACT

A fuel cell system includes a fuel cell body that includes a middle plate and an electricity generating unit that generates electricity by a reaction of air and fuel. The middle plate includes a plurality of unit sections, a supply passage formed inside the middle plate, a supply opening for supplying the fuel to the supply passage, a plurality of inlet openings formed on the unit sections, a discharge passage formed inside the middle plate, a plurality of outlet openings formed on the unit sections, and a discharge opening for discharging the fuel from the discharge passage. The fuel is supplied to the unit sections through the inlet openings, and the fuel discharged from the unit sections being discharged to the discharge passage through the outlet openings. In one embodiment, an opening area of an inlet opening become smaller as the inlet opening is located farther from the supply opening. In another embodiment, a vertical cross-sectional area of the supply passage becomes smaller as the location of the vertical cross-section becomes farther from the supply opening.

22 Claims, 6 Drawing Sheets

FUEL CELL SYSTEM

CLAIM FOR PRIORITY

This application makes reference to, incorporates the same herein, and claims all benefits accruing under 35 U.S.C. §119 from an application earlier filed in the Korean Intellectual Property Office on Sep. 13, 2007 and there duly assigned Serial Number 10-2007-0093277.

BACKGROUND OF THE INVENTION

1. Field of the Invention

The present invention relates to a fuel cell system, and more particularly, to a fuel cell system that can equally supply fuel to a plurality of electricity generating units which generate electricity by reacting fuel with air supplied from the outside.

2. Description of the Prior Art

A fuel cell is an electricity generating system that directly converts chemical reaction energy of hydrogen contained hydrocarbon substances such as methanol, ethanol and natural gas and an oxidizing agent into electric energy. This fuel cell typically comprises a polymer electrolyte membrane fuel cell (hereinafter referred to as a "PEMFC") system and a direct methanol fuel cell (hereinafter referred to as a "DMFC") system.

Generally, the PEMFC system comprises a stack that generates electric energy by a reaction of hydrogen and oxygen, and a reformer that generates hydrogen by reforming fuel. This PEMFC system has an advantageous effect of high energy density and high power. However, the PEMFC system requires careful handling of hydrogen gas and subsidiary facilities such as a fuel reformer for reforming methane or methanol and natural gas so as to produce fuel gas, i.e., hydrogen.

On the other hand, the DMFC system generates electricity by electrochemical reaction by directly supplying methanol fuel and an oxidizing agent, i.e., oxygen to the stack. This DMFC system has an advantageous effect in that energy density and power density are very high, and subsidiary facilities such as a fuel reformer and so on are not required because liquid fuel such as methanol is directly used, and fuel is easily stored and supplied.

In the DMFC system, the stack that actually generates electricity has a structure in which at least one unit cell including a membrane-electrode assembly (hereinafter referred to as a "MEA") and a separator (or a bipolar plate) are stacked. The MEA is formed by interposing an electrolyte membrane between an anode electrode and a cathode electrode. Furthermore, each of the anode electrode and the cathode electrode is provided with a fuel diffusion layer for supplying and diffusing fuel, a catalyst layer for an oxidation/reduction reaction of fuel, and an electrode support.

The DMFC system can be variously formed depending on the arrangement structure of an electricity generating unit and the supply method of air. One type among them is a mono-polar type in which electricity generating unit is formed by arranging a plurality of unit cells on a plane. The mono-polar type is also referred to as a passive type or a semi-passive type because a pump is not used for supplying air.

The fuel cell system of the mono-polar type is formed in a plate form, and is formed such that a plurality of unit cells generating electricity by a reaction of fuel and air supplied from the outside are arranged on a plane. The plurality of unit cells constituting the electricity generating unit are provided with a cathode part to which air is supplied and an anode part to which fuel is supplied. The cathode electrode is exposed to air and is supplied with air by natural diffusion or convection effect of air. Furthermore, the anode part is supplied with fuel by a pump.

The unit cells are arranged on a plane, and thus are sequentially supplied with fuel from the unit cell formed on one side. Hence, a difference in the pressure of the supplied fuel is occurred depending on the position of the unit cell, and thus a difference in the amount of the supplied fuel is caused. Furthermore, the fuel cell system has a problem in that the power and efficiency thereof is lowered due to a difference in power produced in each unit cell.

SUMMARY OF THE INVENTION

The present invention is conceived to solve the aforementioned problems. An object of the present invention is to provide a fuel cell system that can equally supply fuel to a plurality of electricity generating units which generate electricity by reacting fuel supplied from the outside with air.

In order to accomplish the aforementioned object, a fuel cell system of the present invention comprises a fuel cell body comprising a middle plate and an electricity generating unit that generates electricity by a reaction of air and fuel. The middle plate supplies the fuel to the electricity generating unit. The middle plate includes a plurality of unit sections, a supply passage formed inside the middle plate, a supply opening for supplying the fuel to the supply passage, a plurality of inlet openings, a discharge passage formed inside the middle plate, a plurality of outlet openings, and a discharge opening for discharging the fuel from the discharge passage. Each of the inlet openings is formed on one of the unit sections, and the fuel supplied to the supply passage is supplied to the unit sections through the inlet openings. One of the inlet openings, which is located farther from the supply opening than another of the inlet openings, has a smaller opening area than the another of the inlet openings. Each of the outlet openings is formed on one of the unit sections, and the fuel discharged from the unit sections is discharged to the discharge passage through the outlet openings.

The middle plate can be formed in a form of a plate. The middle plate has a first surface and a second surface facing the first surface. The unit sections are formed on the first surface, and each of the unit sections is recessed from the first surface. The middle plate has a third surface on which the supply opening is formed, and a fourth surface on which the discharge opening is formed.

A cross-section of each of the inlet openings, which is cut parallel to the first surface, can have a shape of a rectangle that has a height defined along a direction substantially parallel to the third surface and a width defined along a direction substantially perpendicular to the third surface. All of the inlet openings may have substantially the same height, and the one of the inlet openings, which is located farther from the supply opening than the another of the inlet openings, may have a smaller width than the another of the inlet openings.

A cross-section of each of the outlet openings, which is cut parallel to the first surface, can have a shape of a rectangle that has a height defined along a direction substantially parallel to the third surface and a width defined along a direction substantially perpendicular to the third surface, and all of the outlet openings have substantially the same opening area. All of the outlet openings may have substantially the same height, and all of the outlet openings have substantially the same width. The height of the outlet openings can be substantially the same as the height of the inlet openings, and the width of the outlet openings can be substantially the same as an average of the widths of the inlet openings.

The supply passage can be formed substantially perpendicular to the third surface and formed in the lower part of the middle plate, and the discharge passage can be formed substantially perpendicular to the fourth surface and formed in the upper part of the middle plate. The supply opening can be formed on the lower part of the third surface, and the discharge opening can be formed on the upper part of the fourth surface.

In addition, according to the present invention, the electricity generating unit can comprise an anode part having a fuel passageway that is arranged to closely adhere to one of the unit sections of the middle plate, the fuel supplied to the one of the unit sections flowing through the fuel passageway; a cathode part having an air passageway, air flowing through the air passageway, and a membrane electrode assembly arranged between the anode part and the cathode part. The reaction of the air and the fuel occurs in the membrane electrode assembly. The anode part is formed in a form of a plate and the shape of the anode part is matched with the shape of the one of the unit sections. The fuel passage way has a shape of a zigzag. One end of the fuel passageway is positioned around a region on which one of the inlet openings is formed, and another end of the fuel passageway is positioned around another region on which one of the outlet openings is formed. The cathode part is formed in a form of a plate, and the shape of the cathode part is matched with the shape of the one of the unit sections. The air passageway is formed by a plurality of vent holes.

Furthermore, a fuel cell system of the present invention can further comprise a case for accommodating the fuel cell body, a fuel tank for storing the fuel, and a fuel pump for supplying the fuel from the fuel tank to the middle plate. A side of the case that faces the cathode part has air holes.

Moreover, a fuel cell system of the present invention comprises a fuel cell body that includes a middle plate and an electricity generating unit that generates electricity by a reaction of air and fuel. The middle plate supplies the fuel to the electricity generating unit. The middle plate includes a plurality of unit sections, a supply opening for supplying the fuel, a supply passage formed inside the middle plate, a plurality of inlet openings, a discharge passage formed inside the middle plate, a plurality of outlet openings, and a discharge opening for discharging the fuel from the discharge passage. The supply passage receives the fuel supplied through the supply opening. A cross-sectional area of the supply passage becomes smaller as the location of the cross-section of the supply passage becomes farther from the supply opening. Each of the inlet openings is formed on one of the unit sections. The fuel supplied to the supply passage is supplied to the unit sections through the inlet openings. Each of the outlet openings is formed on one of the unit sections. The fuel discharged from the unit sections is discharged to the discharge passage through the outlet openings.

A shape of the cross-section of the supply passage can be substantially a rectangular or a circular shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Hereinafter, the embodiments of the present invention will be described in detail with reference to the accompanying drawings to be easily carried out by a person having ordinary skill in the art.

Referring to FIGS. 1 to 6, a fuel cell system 100 of an embodiment of the present invention comprises a fuel cell body 110. Furthermore, the fuel cell system 100 can further comprise a case 140 that accommodates the fuel cell body 110. Moreover, the fuel cell system 100 can further comprise a fuel tank 180 and a fuel pump 190.

Figure 1:
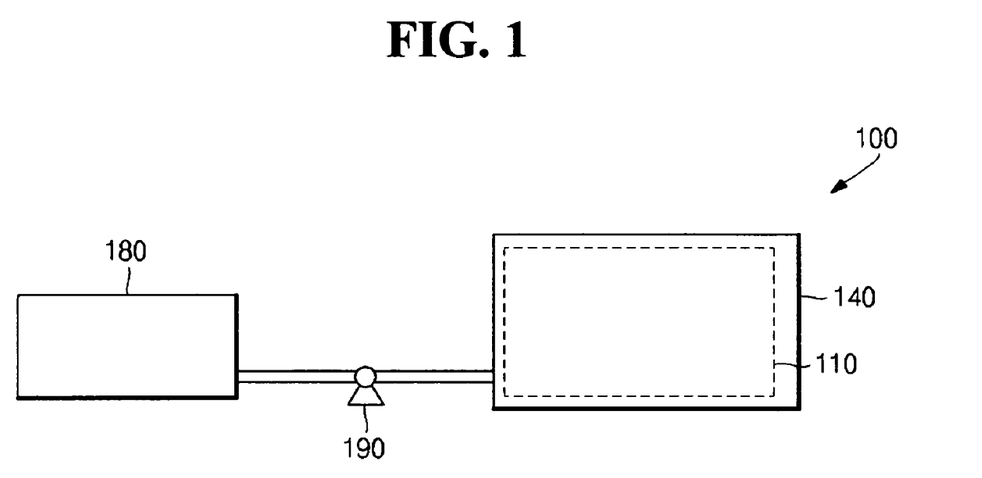
FIG. 1 is a schematic view showing a fuel cell system of an embodiment of the present invention.

The fuel cell system 100 can be configured as a direct methanol fuel cell (DMFC) which is directly supplied with alcohol-based fuel such as methanol, ethanol and so on and air, and generates electricity by oxidation reaction of hydrogen contained in the fuel and reduction reaction of oxygen contained in the air. Furthermore, the fuel cell system 100 is configured in a semi passive type that is supplied with fuel by a fuel pump and a fuel tank and air in the atmosphere by a natural diffusion or convection effect and generates electricity.

Figure 2:
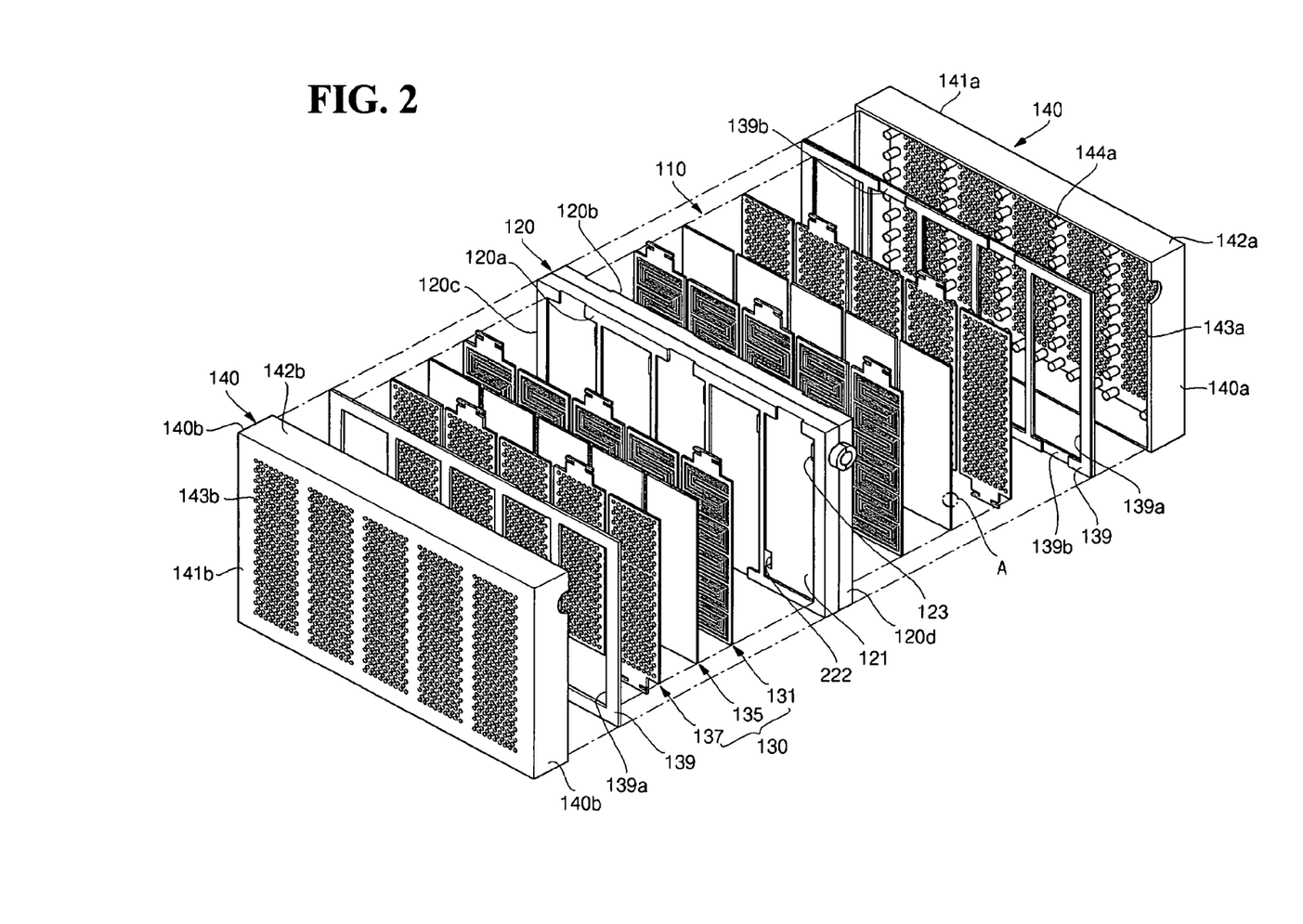
FIG. 2 is an exploded perspective view showing a fuel cell body of a fuel cell system of an embodiment of the present invention.

The fuel cell body 110 comprises a middle plate 120 and a plurality of electricity generating units 130 which are formed on both sides of the middle plate 120. The fuel cell body 110 generates electric energy by a chemical reaction which is performed in the electricity generating unit 130 with fuel supplied through the middle plate 120 and air supplied by natural convection.

Figure 4:
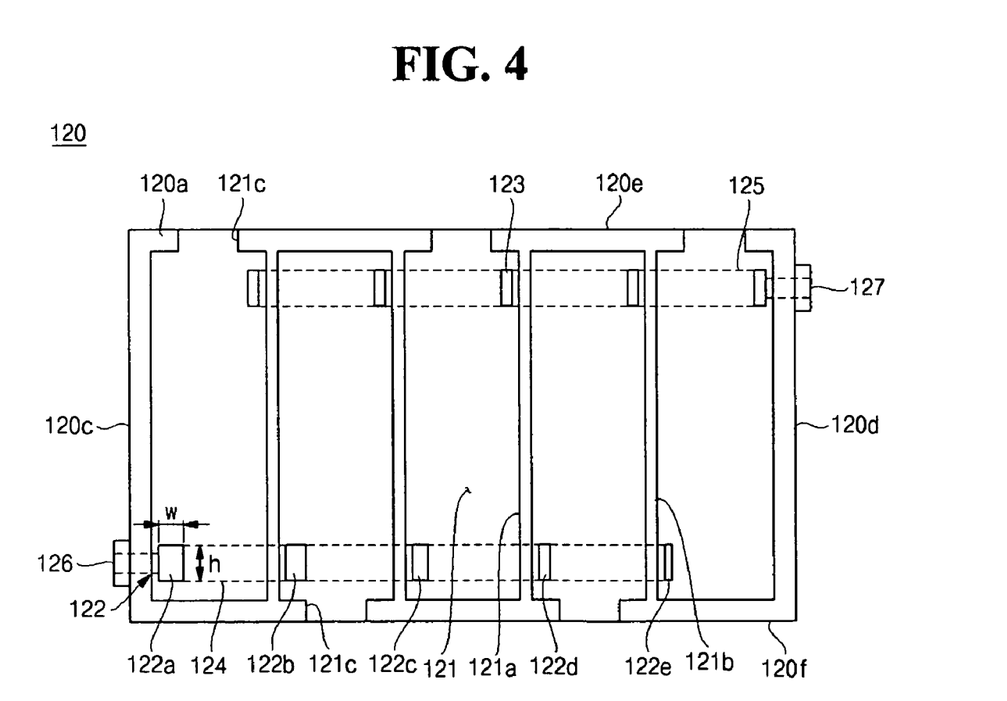
FIG. 4 is a front view showing a middle plate which constitutes the fuel cell body of FIG. 2.

The middle plate 120 comprises a plurality of unit sections 121, inlet openings 122, 122a, 122b, 122c, 122d and 122e, outlet openings 123, a supply passage 124, a discharge passage 125, a supply opening 126 and a discharge opening 127. The middle plate 120 is formed approximately in a plate shape, and is made of an electric insulating material. The size of the middle plate is determined depending on the number of the electricity generating units 130.

The middle plate 120 is formed in an approximately rectangular shape in which the length of a long side is longer than that of a short side. The middle plate 120 is provided with a first surface 120a, a second surface 120b, a third surface 120c, a fourth surface 120d, a fifth surface 120e and a sixth surface 120f. The first surface 120a and the second surface 120b refer to a front surface and a rear surface of the middle plate 120 on which the electricity generating units 130 are arranged. Furthermore, the third surface 120c and the fourth surface 120d refer to one side surface and the other side surface of the middle plate 120 on which the supply opening 126 and the discharge opening 127 are formed, respectively. Moreover, the fifth surface 120e and the sixth surface 120f refer to the top surface and the bottom surface of the middle plate 120. The middle plate 120 supports the electricity generating units 130 arranged on the first surface 120a and the second surface 120b, and works as a separator for electrically separating the electricity generating units 130 from each other. Furthermore, the middle plate 120 works for supplying fuel supplied through the third surface 120c and the fourth surface 120d to the electricity generating units 130.

The unit sections 121 are formed on the first surface 120a and the second surface 120b of the middle plate 120 by dividing them into sections having the same length in the long side direction (along the fifth or sixth surface) of the middle plate 120. The unit sections are formed on the first surface 120a and the second surface 120b as coupling recesses 121a having a recess shape. The unit sections 121 are formed to be separated from other unit sections by protrusions 121b that are protruded and formed between the coupling recesses 121a. Furthermore, terminal recesses 121c are provided on the upper part or the lower part of the middle plate 120. The coupling recesses 121a are formed such that the area thereof corresponds to that of the electricity generating units 130, and thus are coupled with the electricity generating units 130. Hence, the unit sections 121 are formed as active sections where actual reaction is occurred by a reaction of fuel and air supplied to the electricity generating units 130.

The coupling recesses 121a are formed with a predetermined depth from the first surface 120a and the second surface 120b of the middle plate 120. Preferably, the coupling recesses 121a are formed with a depth which corresponds to the thickness of anode parts 131 of the electricity generating units 130 coupled with the coupling recesses 121a or a depth which is larger than the thickness of the anode parts 131. The anode parts 131 will be explained in detail hereinafter.

The coupling recesses 121a are provided on the bottom surface thereof with the inlet openings 122 and the outlet openings 123. The inlet openings 122 and the outlet openings 123 are formed to be spaced apart from each other so that the supplied fuel flows through the electricity generating units 130 and then discharges to the outside. Preferably, the inlet openings 122 and the outlet openings 123 are diagonally positioned to each other within the coupling recesses 121a.

The inlet openings 122 are preferably positioned in the lower part of the unit sections 121. When the fuel cell 100 is built, it is preferred that the inlet opening is actually positioned at a lower part of the fuel cell 100. Hence, the non-reacted fuel that is entered into the inlet openings 122 reacts while flowing upwards from the lower part of the coupling recesses 121a, and then discharges through the outlet openings. Hence, the inlet openings 122 improve the efficiency of fuel use.

The inlet openings 122 are formed in the lower part of the coupling recesses 121a to be connected to the third surface 120c on which the supply opening 126 is formed. Hence, the inlet openings 122 allow fuel supplied from the supply opening 126 to be entered more smoothly into the coupling recesses 121a.

The inlet openings 122 are extended to the inside of the middle plate 120 within the coupling recesses 121a, and are communicated with the supply passage 124. The inlet openings 122 are formed such that their cross-section which is defined perpendicular to the direction extending to the inside of the middle plate 120 has a rectangular shape. The height h of the inlet openings 122 is larger than the width w thereof. Hence, the inlet openings 122 enable more fuel passageways to be formed in the anode part 131.

The inlet openings 122 are preferably formed such that as they are positioned farther from the third surface 120c, i.e., the supply opening 126, their area (area of an opening or an opening area) becomes smaller. Here, the area of the inlet openings 122 means the area of a rectangle which is a cross-section defined perpendicular to the direction to the inside of the middle plate 120. In other words, the area can be obtained by multiplying the width w by height h. Specifically, the inlet openings 122 are formed such that the area of inlet opening 122a positioned closer to the supply opening 126 is larger than the area of the inlet opening 122e positioned far away from the supply opening 126. Hence, the inlet openings 122 are formed such that as they are positioned farther from the supply opening, their area becomes smaller. The inlet openings 122 are preferably formed such that as they are positioned farther from the supply opening, their width w becomes smaller while maintaining the same height h. In case that the inlet openings 122 have the same height h, the anode part 131 which is coupled with the coupling recess 121a can have the same fuel passageway.

The area ratio between the inlet openings 122, that is, the width ratio among the inlet openings can be appropriately determined considering the amount, speed and pressure of fuel supplied from the supply opening, the size of the supply passage 124, the size of the coupling recess 121a, and so on.

In the supply passage 124, the speed of the supplied fuel becomes higher as it is positioned farther from the supply opening 126. The supply passage 124 starting at third surface 120c has a dead end before reaching the fourth surface 120d that is a side opposite to the supply opening 126. Hence, the pressure of fuel supplied from the supply opening 126 becomes higher as the fuel flows farther from the supply opening 126. Therefore, the speed of the supplied fuel becomes higher in the inlet openings 122 that are positioned farther from the supply opening 126. Furthermore, for the inlet openings 122 that are positioned farther from the supply opening 126, the pressure of the supplied fuel becomes higher. However, for the inlet openings 122 that are positioned farther from the supply opening 126, their areas of openings becomes smaller. Hence, the inlet openings 122 enable a supply of an equal amount of fuel into the coupling recesses 121a regardless of the locations of the inlet openings 122.

The outlet openings 123 are formed in the upper part of the coupling recesses 121a to be connected to the fourth surface 120d. The outlet openings 123 are extended to the inside of the middle plate 120 from the bottom surface of the coupling recesses 121a, and are communicated with the discharge passage 125. The outlet openings 123 discharge fuel, which is used for an electricity generating reaction in the coupling recesses 121a, to the outside of the coupling recesses 121a.

The outlet openings 123 are formed such that their cross-section which is perpendicular to the direction extending to the inside of the middle plate 120 has a rectangular shape. Furthermore, the outlet openings 123 are formed such that their area (are of the openings) is the same irrespective of their positions. Here, the area of the outlet openings 123 means the area of a rectangle which is a cross-section defined perpendicular to the direction extending to the inside of the middle plate 120. The height of the outlet openings 123, which is defined as a size parallel to the third surface 120c, is the same as that of the inlet openings 122. The width of the outlet openings 123, which is defined as a size perpendicular to the third surface 120c, is substantially the same as an average of the widths of the inlet openings 122. In the case that the width of the outlet openings 123 is the same as an average of the widths of the inlet openings 122, the total area of the outlet openings 123 is the same as that of the inlet openings 122. In this case, therefore, the amount of fuel discharged from the outlet openings 123 is the same as that entered from the inlet openings 122. Hence, the middle plate 120 allows fuel to be smoothly entered into and discharged from the coupling recesses 121a.

The supply passage 124 is formed parallel with the first surface 120a in the direction extending from the third surface 120c to the fourth surface 120d, and formed in the inside of the lower part of the middle plate 120. The cross-section of the supply passage 124, which is cut perpendicular to the direction of the passage, has a circular or rectangular tubular shape. The supply passage 124 is formed to communicate with the inlet openings 122 formed on the lower part of the coupling recesses 121a. The supply passage 124 has an open end at the side of the third surface 120c, and has a closed end at the other side thereof. Hence, the supply passage 124 sequentially supplies the non-reacted fuel, which is supplied from the outside, to the lower part of the coupling recesses 121a through the inlet openings 122.

The discharge passage 125 is formed parallel with the first surface 120a in the direction extending from the fourth surface 120d to the third surface 120c, and formed in the inside of the upper part of the middle plate 120. The cross-section of the discharge passage 125, which is cut perpendicular to the direction of the passage, has a circular or rectangular tubular shape. The discharge passage 125 is formed to communicate with the outlet openings 123 formed on the upper part of the coupling recesses 121a. The discharge passage 125 has a closed end at one side thereof, and has open end at the other side thereof that is at the side of the fourth surface 120d. Hence, the discharge passage 125 sequentially discharges fuel, which is supplied through the inlet openings 122 into the coupling recesses 121a, to the outside of the middle plate 120.

Meanwhile, the supply passage 124 and the discharge passage 125 can be formed by coupling the middle plate 120 with two separate plates on which corresponding recesses are formed respectively. Furthermore, the supply passage 124 and the discharge passage 125 can be formed by machining recesses (or holes) from each side of an integrally-formed middle plate to the inside thereof.

The supply opening 126 is formed to communicate with the supply passage 124 in the lower part of the third surface 120c of the middle plate 120. The supply opening 126 can be formed integrally with the supply passage 124. The supply opening 126 is connected with the fuel pump 190 and supplies the non-reacted fuel to the supply passage 124.

The discharge opening 127 is formed to communicate with the discharge passage 125 in the upper part of the fourth surface 120d of the middle plate 120. The discharge opening 127 can be formed integrally with the discharge passage 125. The discharge opening 127 is connected with a separate mixing tank and discharges fuel flowing from the discharge passage 125 to the outside of the middle plate 120.

Figure 3:
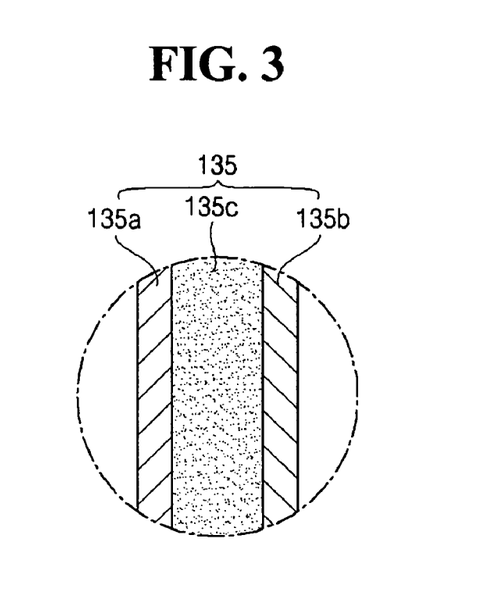
FIG. 3 is a partial sectional view showing a membrane-electrode assembly in an electricity generating unit which constitutes a fuel cell body constructed as an embodiment of the present invention.

The electricity generating unit 130 comprises an anode part 131, a membrane-electrode assembly 135 (hereinafter referred to as a "MEA") arranged to closely adhere to the anode part 131, and a cathode part 137 arranged to closely adhere to the MEA 135. The anode part 131, the membrane-electrode assembly 135, and the cathode part 137 form one unit cell. The electricity generating unit 130 is formed to include a plurality of unit cells, each of which generates electric energy by a reaction of fuel and air supplied thereto. Each of the unit cells of the electricity generating unit 130 is arranged being aligned to the respective unit section 121 which is formed on the first surface 120a or the second surface 120b of the middle plate 120.

The anode part 131 comprises an anode current collecting plate 131a and an anode electrode terminal 131b (shown in FIG. 5), and is arranged to closely adhere to a unit section. The anode part 131 serves as a guide for allowing the non-reacted fuel to flow through the inside of the coupling recesses 121a. Furthermore, the anode part 131 serves as an electric conductor for moving an electron separated from hydrogen contained in fuel to the cathode part 137 of the adjoining electricity generating unit 130 by a first electrode layer 135a (shown in FIG. 3).

Figure 5:
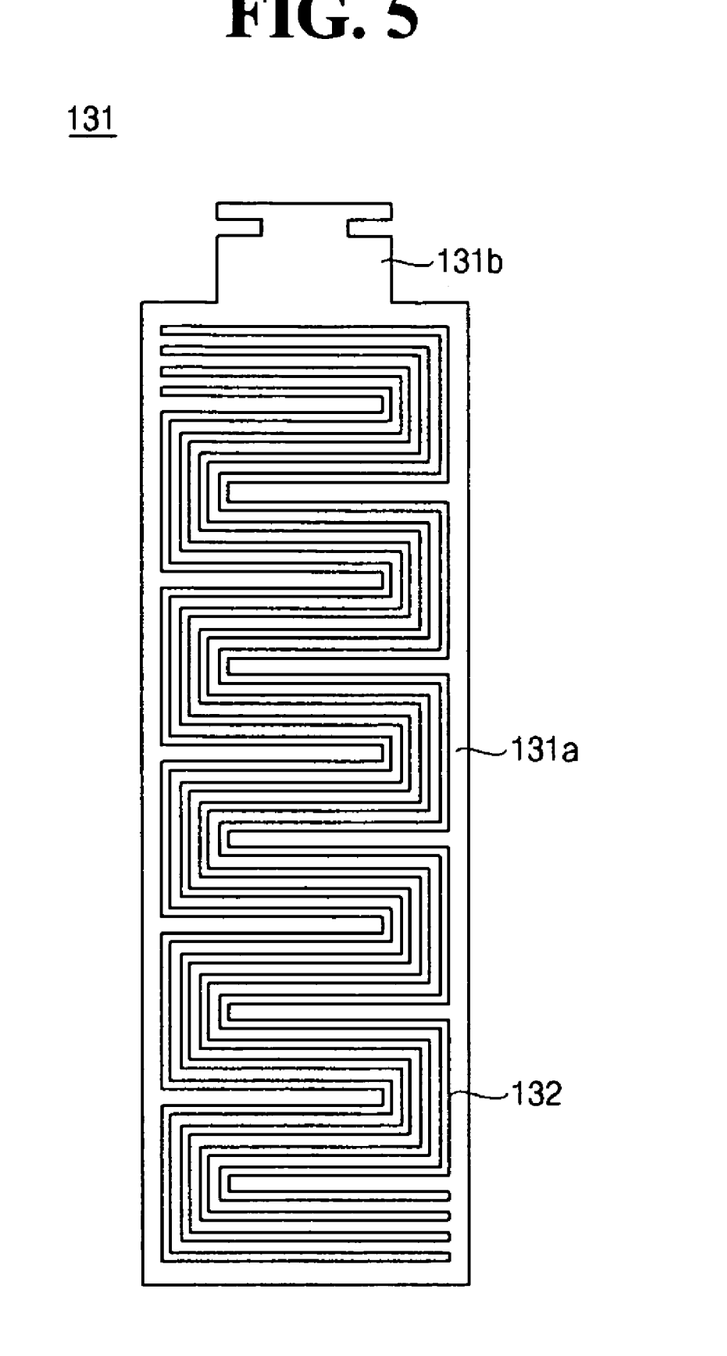
FIG. 5 is a front view showing an anode part which constitutes the fuel cell body of FIG. 2.

The anode current collecting plate 131a is formed in the form of a plate, and can be formed by a metal having excellent electric conductivity such as gold, silver and copper or by plating the surface of a bare metal with a metal such as gold, silver and copper. The anode current collecting plate 131a is provided with fuel passageways 132 for flowing fuel. The anode current collecting plate 131a closely adheres to the coupling recesses 121a of the unit sections 121 of the middle plate 120. Furthermore, the anode current collecting plate 131a closely adheres to the first electrode layer 135a of the MEA 135.

The fuel passageways 132 are formed to be recessed in the plate of the anode current collecting plate 131a in a predetermined width and depth. A plurality of passageways is formed in a zigzag or meander shape, and the passageways are arranged maintaining regular distances from each other. That is, the fuel passageways 132 are arranged parallel with each other at predetermined distances, and each of the passageways has a zigzag or meander shape. Of course, the fuel passageways 132 can be formed in various shapes. One end of the fuel passageway is positioned on a region around which the inlet openings 122 are formed, and the other end of the fuel passageway is positioned on a region around which the outlet openings 123 are formed. That is, the fuel passageways 132 are formed as a plurality of paths connecting the inlet openings 122 region to the outlet openings 123 region. Hence, the fuel passageways 132 supply fuel, which is supplied through the supply passage 124 and the inlet openings 122 of the middle plate 120, to the first electrode layer 135a of the MEA 135.

The anode electrode terminal 131b is inserted into the terminal recess 121c of the middle plate 120, and is protruded beyond the middle plate 120. The anode electrode terminal 131b is electrically coupled with the cathode part 137 of the adjoining electricity generating unit 130 through a conducting wire.

The anode electrode terminal 131b is formed integrally with the anode current collecting plate 131a, and is formed to extend in the direction of the upper part or the lower part of the middle plate 120. Wherever direction the anode electrode terminal 131b extends, the anode electrode terminal 131b protrudes beyond the middle plate 120. The anode electrode terminal 131b is electrically coupled with a cathode electrode terminal 137b by a coupling terminal (not shown).

The MEA 135 is formed by sequentially stacking the first electrode layer 135a, an electrolyte layer 135c and a second electrode layer 135b. The first electrode layer 135a can be formed as an anode electrode layer for separating hydrogen contained in fuel into an electron and a hydrogen ion. The electrolyte layer 135c moves the hydrogen ion to the second electrode layer 135b, and the second electrode layer 135b can be formed as a cathode electrode layer for generating moisture and heat through reaction of the electron and the hydrogen ion supplied from the first electrode layer 135a with oxygen supplied separately. At this time, the size of the MEA 135 corresponds to the anode part 131 and the cathode part 137, and the MEA can be provided at its edge region with a common gasket (not shown). The MEA 135 is arranged on the unit section 121 of the middle plate 120 so that the first electrode layer 135a closely adheres to the anode part 131. The MEA 135 can be formed in a structure commonly used for a direct methanol fuel cell, and detailed explanation thereabout will be omitted.

Figure 6:
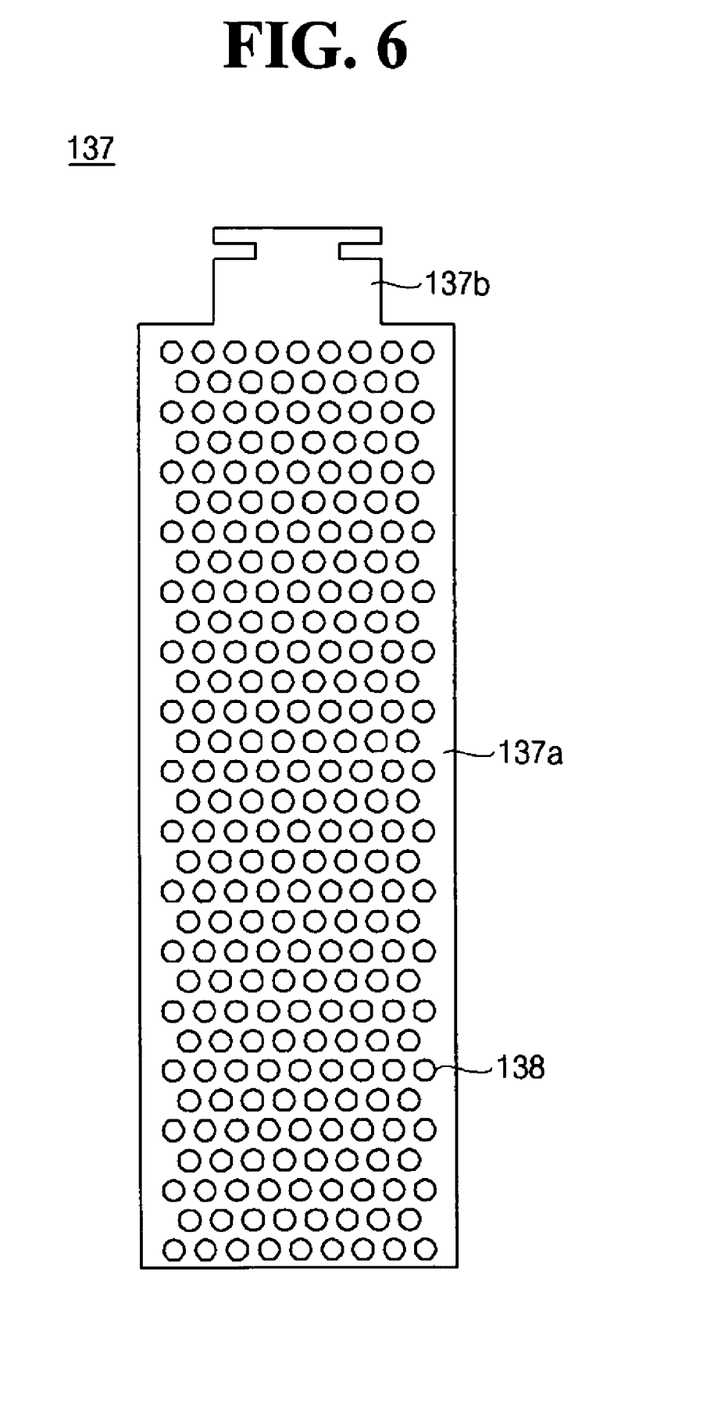
FIG. 6 is a front view showing a cathode part which constitutes the fuel cell body of FIG. 2.

The cathode part 137 comprises a cathode current collecting plate 137a and a cathode electrode terminal 137b (shown in FIG. 6). The cathode part 137 is arranged to closely adhere to the second electrode layer 135b of the MEA 135, and distributes and supplies air in the atmosphere to the MEA 135 by allowing it to flow by natural diffusion or convection effect of air. The size of the cathode part 137 corresponds to the anode part 131 or the MEA 135. Furthermore, the cathode part 137 serves as an electric conductor that is electrically coupled with the adjoining anode part 131 of the electricity generating unit 130, and receives an electron.

The cathode current collecting plate 137a is formed by an electrically conductive metal plate, and is provided with an air passageway 138 for flowing air. The cathode current collecting plate 137a can be formed by a metal having excellent electric conductivity such as gold, silver and copper or by plating the surface of a bare metal with a metal such as gold, silver and copper.

In order to effectively distribute and supply air and maintain the strength of the cathode current collecting plate, the air passageway 138 is formed in a shape of a hole having a circular or polygonal cross-section, which penetrates the plate of the cathode current collecting plate 137a.

The cathode electrode terminal 137b is formed integrally with the cathode current collecting plate 137a, and is formed to extend in the direction of the upper part or the lower part of the middle plate 120, and protrude beyond the middle plate 120. The cathode electrode terminal 137b is electrically coupled with the anode electrode terminal 131b by a coupling terminal.

A support plate 139 (shown in FIG. 2) is formed in the form of a plate, and closely joins the electricity generating unit 130 to the middle plate 120 while contacting with the cathode part 137. The support plate 139 comprises openings 139a and terminal recesses 139b. Each of the openings 139a is formed on a region corresponding to a region on which a unit cell of the electricity generating unit 130 is formed, and has the area (an area of an opening) corresponding to the area of a region on which the air passageway 138 is formed in the cathode current collecting plate 137a. The terminal recess 139b is formed on the upper part or the lower part of the opening 139a in the form of a recess having the size corresponding to the width of the anode electrode terminal 131b and the cathode electrode terminal 137b, and is coupled with the anode electrode terminal 131b and the cathode electrode terminal 137b.

The case 140 comprises a first case 140a and a second case 140b, and is formed approximately in a box shape. Furthermore, the case 140 comprises air holes 143a and 143b and support protrusions 144a (support protrusions of the second case is not shown). The case 140 receives the fuel cell body 110 therein. The first case and the second case are formed symmetrically to each other.

The first case 140a and the second case 140b are formed in a form of an open box that has an open side and a hollow space inside. The first case 140a is coupled with the second case 140b to form a space therebetween, and receives the fuel cell body 110. At this time, a first flat plate 141a of the first case 140a and a second flat plate 141b of the second case 140b are located opposite sides of the fuel cell body 110, respectively.

The air holes 143a and 143b are formed on the first flat plate 141a of the first case 140a and the second flat plate 141b of the second case 140b respectively. The air holes 143a and 143b are formed on a region in the first flat plate 141a and the second flat plate 141b that corresponds to a region on which the electricity generating unit 130 is positioned, when the fuel cell body 110 is received therein. The air holes 143a and 143b allow air in the atmosphere to enter the inside thereof and to be supplied to the electricity generating unit 130. The air holes 143a and 143b penetrate the first flat plate 141a and the second flat plate 141b respectively, and can be formed in various shapes such as a circle, a rectangle or a hexagon. The plurality of air holes 143a and 143b is formed in the form of a hole to be spaced apart from each other.

The support protrusion 144a of the first case 140a is formed in the form of a bar or a hemisphere that vertically protrudes on a region in the first flat plate 141a except for a region on which the air holes 143a are formed. Furthermore, the support protrusion 144a has the height corresponding to the distance between the first case 140a and the fuel cell body 110. The support protrusions 144a are formed in appropriate numbers required for supporting the fuel cell body 110, and thus support the fuel cell body 110. More specifically, the support protrusion 144a contact the protrusion 121b formed around the coupling recess 121a of the middle plate 120, and supports the fuel cell body 110. Although the support protrusions formed on the second case 140b are not shown in the drawing, they are formed identically with the support protrusions 144a of the first case 140a.

The fuel tank 180 is formed in the form of a box that is provided with a space for storing a liquid fuel therein, and stores fuel to be supplied to the fuel cell body 110. The fuel tank 180 stores ethanol or methanol having concentration required for the fuel cell body 110. The fuel tank 180 is connected with the fuel pump 190 through one pipe, and supplies the stored fuel to the supply passage of the fuel cell body 110.

The fuel pump 190 is connected with the fuel cell body 110 through one pipe and is connected with the fuel tank 180 through the other pipe. Hence, the fuel pump 190 supplies fuel stored in the fuel tank 180 to the fuel cell body 110. As the fuel pump 190, various pumps that can transfer a liquid are used.

A fuel cell system according to another embodiment of the present invention will be described.

Figure 7:
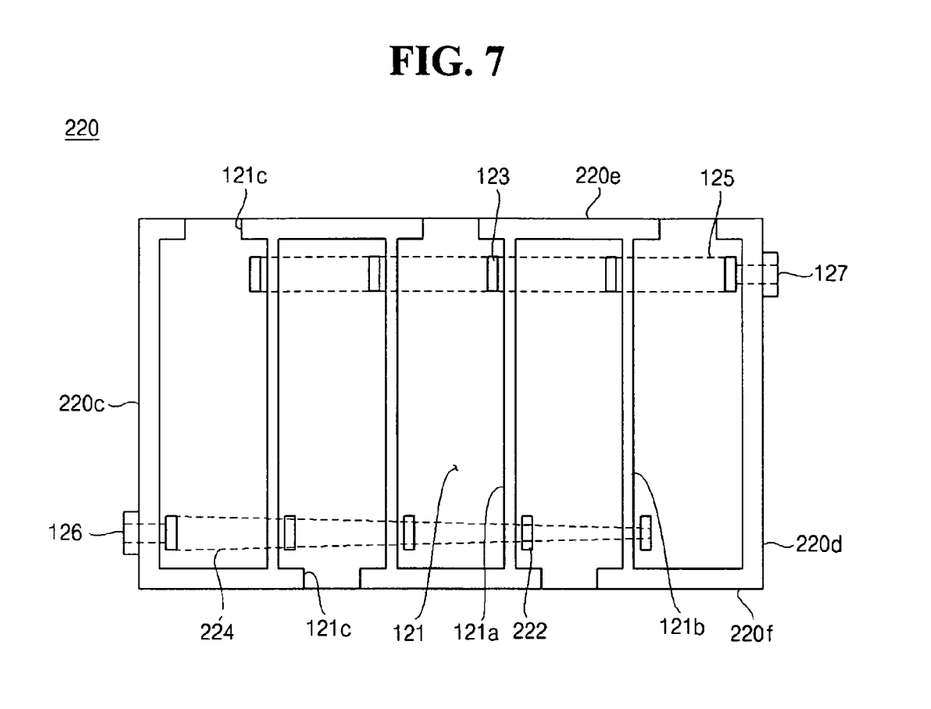
FIG. 7 is a front view showing a middle plate of a fuel cell system constructed as another embodiment of the present invention.
Figure 8:
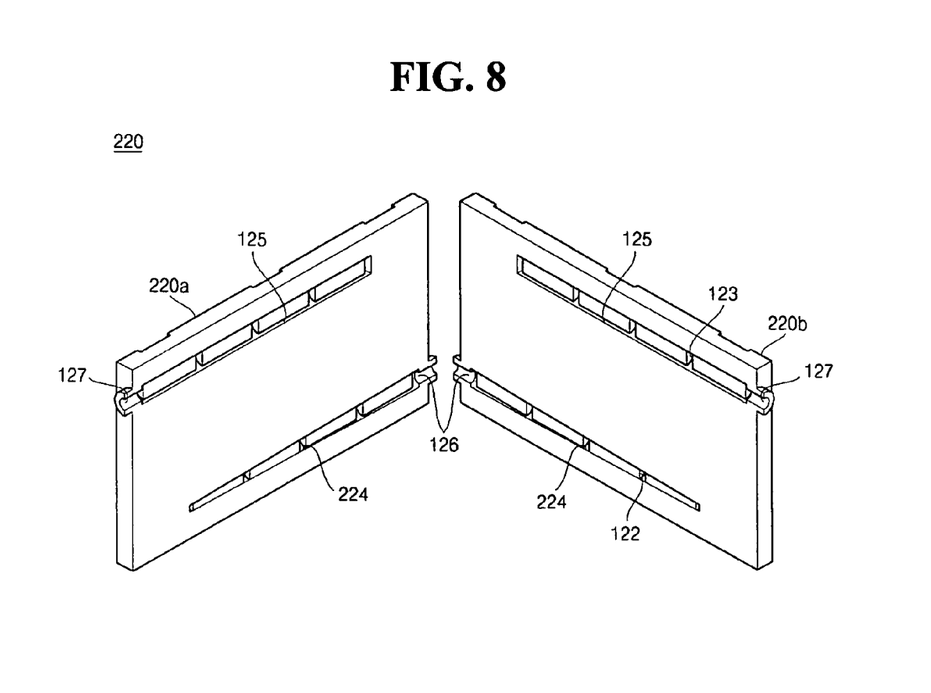
FIG. 8 is an exploded perspective view showing the middle plate of FIG. 7.

FIG. 7 is a front view showing a middle plate of a fuel cell system constructed as another embodiment of the present invention. FIG. 8 is an exploded perspective view showing a middle plate of FIG. 7.

A fuel cell system according to another embodiment of the present invention comprises a fuel cell body with a middle plate 220. Furthermore, the fuel cell system comprises a case 140 that surrounds a plurality of electricity generating units 130 which are formed on both sides of the middle plate 220 and the fuel cell body. Moreover, the fuel cell system can further comprise a fuel tank 180 and a fuel pump 190. In the fuel cell system according to another embodiment of the present invention, the structure of the middle plate 220 is different from that of the fuel cell system 100 shown in FIGS. 1 to 6. Hence, in the fuel cell system according to another embodiment of the present invention, parts which are the same as or similar to those in the fuel cell system 100 shown in FIGS. 1 to 6 are denoted by the same reference numeral, and detailed explanation thereabout will be omitted. Hereinafter, an explanation about the middle plate will be made.

The middle plate 220 comprises a plurality of unit sections 121, inlet openings 222, outlet openings 123, a supply passage 224, a discharge passage 125, a supply opening 126, and a discharge opening 127. The middle plate 220 is formed approximately in a plate shape and made of an electric insulating material. The size of the middle plate 220 is determined depending on the number of the electricity generating units 130, and the middle plate 220 is formed in an approximately rectangular shape in which the length of a long side is longer than that of a short side. The middle plate 220 is provided with a first surface 220a, a second surface 220b, a third surface 220c, a fourth surface 220d, a fifth surface 220e and a sixth surface 220f.

The unit sections 121 are formed on the first surface 220a and the second surface 220b of the middle plate 220 by dividing them into sections having the same length in the long side direction of the middle plate 220. The unit sections 121 are formed on the first surface 220a and the second surface 220b as coupling recesses 121a having a recess shape. The unit sections 121 are formed to be separated from other unit sections by protrusions 121b that are formed between the coupling recesses 121a. Furthermore, terminal recesses 121c are provided on the upper part or the lower part of the middle plate 220. The coupling recesses 121a are provided on the bottom surface thereof with the inlet openings 222 and the outlet openings 123.

The inlet openings 222 are formed on the lower bottom surface within the coupling recesses 121a of the unit sections 121. Furthermore, the inlet openings 222 are extended to the inside of the middle plate 220 and are communicated with the supply passage 224. The inlet openings 222 are formed such that their cross-section which is defined perpendicular to the direction extending to the inside of the middle plate 220 has a rectangular shape. The height of the inlet openings 222 is larger than the width thereof.

The inlet openings 222 have the same area irrespective of their positions. Here, the area of the inlet openings 222 means the area of a rectangle which is a cross-section defined perpendicular to the direction to the inside of the middle plate 220. That is, the inlet openings 222 have the same height and width.

The outlet openings 123 are formed on the upper bottom surface within the coupling recesses 121a of the unit sections 121. Furthermore, the outlet openings 113 are extended to the inside of the middle plate 220 and are communicated with the discharge passage 125. The outlet openings 123 have a shape corresponding to that of the outlet openings. The outlet openings 123 have the same area as the inlet openings 222.

The supply passage 224 is formed parallel with the first surface 220a in the direction extending from the third surface 220c to the fourth surface 220d in the inside of the lower part of the middle plate 220. The supply passage 224 has a cross-section of circular or rectangular tubular shape. The supply passage 224 is formed to communicate with the inlet openings 222 formed on the lower part of the coupling recesses 121a. The supply passage 224 is open at one side thereof to the third surface 120c and is closed at the other side thereof. Hence, the supply passage 224 sequentially supplies the non-reacted fuel, which is supplied from the outside, to the lower part of the coupling recesses 121a through the inlet openings 122.

The supply passage 224 is preferably formed such that as it becomes farther from the third surface 220c, i.e., the supply opening 126, its cross-sectional area becomes smaller. Here, the cross-sectional area of the supply passage 224 means the area of a circle or rectangle that is a cross-section defined to be perpendicular to the flowing direction of the supplied fuel (or the direction of the passage). That is, in case that the supply passage 224 is formed in the form of a circular cylinder, the area of the supply passage 224 means the area of the circle, which is a cross-section of the circular cylinder. Furthermore, in the case that the supply passage 224 is formed in the form of a rectangular pillar, the area of the supply passage 224 means the area of the rectangle.

Hence, as the supply passage 224 becomes farther from the supply opening 126, the inside thereof is slanted. That is, as the supply passage 224 becomes farther from the supply opening, the diameter of a circle or the width of a rectangle of the supply passage 224 becomes smaller. As the supply passage 224 becomes farther from the supply opening 126, the speed of the supplied fuel is increased. As the supply passage 224 becomes farther from the supply opening, the cross-sectional area thereof becomes smaller, and thus the amount of the supplied fuel is reduced. Hence, the supply passage 224 allows substantially the same amount of fuel to be supplied to the respective inlet openings.

Meanwhile, as the supply passage 224 becomes farther from the supply opening 126, the cross-sectional area thereof becomes smaller. However, the inlet openings 222 have the same size irrespective of their distance from the supply opening 126. Hence, the fuel passageways 132 of the anode part 131 communicated with the inlet openings 222 have the same shape in accordance with the position of the unit sections 121.

The discharge passage 125 is formed parallel with the first surface 220a in the direction extending from the fourth surface 220d to the third surface 220c in the inside of the upper part of the middle plate 220. The discharge passage 125 has a cross-section of circular or rectangular tubular shape. The discharge passage 125 is formed to communicate with the outlet openings 123 formed on the upper part of the coupling recesses 121a.

The supply opening 126 is formed to communicate with the supply passage 224 in the lower part of the third surface 220c of the middle plate 220. The discharge opening 127 is formed to communicate with the discharge passage 125 in the upper part of the fourth surface 220d of the middle plate 220.

The operation of a fuel cell system according to an embodiment of the present invention will be described. Hereinafter, an explanation about the operation of the fuel cell system according to an embodiment shown in FIGS. 1 to 6 will be made.

First, the fuel pump 190 supplies fuel stored in the fuel tank 180 to the fuel cell body 110. The fuel supplied to the fuel cell body 110 is supplied to the supply passage 124 through the supply opening 126. The supply passage 124 supplies the supplied fuel to the lower part of the coupling recess 121a of each unit section 121 through the inlet opening 122. At this time, as the inlet openings 122 are positioned farther from the supply opening 126, the velocity of the supplied fuel becomes higher. Hence, the amount of fuel supplied to the coupling recess 121a of each unit section 121 is equalized. The fuel is sequentially supplied from the lower portion of the coupling recesses 121a of the unit sections 121 to the upper portion of the coupling recesses 121a of the unit sections.

The fuel passageway 132 of the anode part 131 enables the supplied fuel to flow through the upper part of the coupling recess 121a and to be supplied to the first electrode layer 135a of the MEA 135. Meanwhile, the air passageway 138 of the cathode part 137 supplies air supplied from the outside by convection to the second electrode layer 135b of the MEA 135. Each unit section of the electricity generating unit 130 receives almost the same amount of fuel regardless of its relative position, and thus can maintain the same electricity generating efficiency. The fuel used for an electricity generating reaction in each unit section 121 is discharged from the discharge passage 125 through the outlet opening 123. The discharge passage 125 discharges the discharged fuel to the outside of the middle plate 120 through the discharge opening 127.

According to the fuel cell system of the present invention, this advantageous effect is attained that since fuel is equally supplied irrespective of the position of the electricity generating unit in the middle plate, it is possible to equally generate electricity, and thus the performance and efficiency thereof is improved. Furthermore, according to the present invention, such an advantageous effect is attained that an electricity generating reaction is equally carried out in electricity generating unit, and thus the durability of the fuel cell system is improved.

Although preferred embodiments of the present invention have been described for illustrative purposes, those skilled in the art will appreciate that various modifications and changes thereof are possible without departing from the scope and spirit of the present invention, and all modifications and changes are intended to be comprised within the description of the claims.

What is claimed is:

1. A fuel cell system comprising:
    a fuel cell body comprising:
        an electricity generating unit that generates electricity by a reaction of air and fuel; and
        a middle plate for supplying the fuel to the electricity generating unit, the middle plate comprising:
            a plurality of unit sections;
            a supply passage formed inside the middle plate;
            a supply opening for supplying the fuel to the supply passage;
            a plurality of inlet openings, each of the inlet openings formed on one of the unit sections, the fuel supplied to the supply passage being supplied to the unit sections through the inlet openings, one of the inlet openings, which is located farther from the supply opening than another of the inlet openings, having a smaller opening area than the other of the inlet openings;
            a discharge passage formed inside the middle plate;
            a plurality of outlet openings, each of the outlet openings formed on one of the unit sections, the fuel discharged from the unit sections being discharged to the discharge passage through the outlet openings, a total area of the outlet openings being the same as a total area of the inlet openings, all of the outlet openings having substantially the same opening area; and
            a discharge opening for discharging the fuel from the discharge passage.

2. The fuel cell system as claimed in claim 1, wherein the middle plate is formed in a form of a plate, the middle plate having a first surface and a second surface facing the first surface, the unit sections being formed on the first surface, each of the unit sections being recessed from the first surface, the middle plate having a third surface on which the supply opening is formed, the middle plate having a fourth surface on which the discharge opening is formed.

3. The fuel cell system as claimed in claim 2,
    wherein a cross-section of each of the inlet openings, which is cut to the first surface, has a shape of a rectangle that has a height defined along a first direction substantially parallel to the third surface and a width defined along a second direction substantially perpendicular to the third surface and perpendicular to the first direction.

4. The fuel cell system as claimed in claim 3, wherein all of the inlet openings have substantially the same height, and the one of the inlet openings, which is located farther from the supply opening than the other of the inlet openings, has a smaller width than the another of the inlet openings.

5. The fuel cell system as claimed in claim 2,
    wherein the inlet openings are formed through the first surface in a lower part of the unit sections and are extended along the middle plate in order to communicate with the supply passage, and the outlet openings are formed through the first surface in an upper part of the unit sections and are extended along the middle plate in order to communicate with the discharge passage.

6. The fuel cell system as claimed in claim 3,
    wherein a cross-section of each of the outlet openings, which is cut parallel to the first surface, has a shape of a rectangle that has a height defined along the first direction substantially parallel to the third surface and a width defined along the second direction substantially perpendicular to the third surface and perpendicular to the first direction.

7. The fuel cell system as claimed in claim 6, wherein all of the outlet openings have substantially the same height, and all of the outlet openings have substantially the same width.

8. The fuel cell system as claimed in claim 7, wherein the heights of the outlet openings are substantially the same as the heights of the inlet openings, and the widths of the outlet openings are substantially the same as an average of the widths of the inlet openings.

9. The fuel cell system as claimed in claim 2, wherein the supply passage is formed through the third surface and formed along a lower part of the middle plate, and the discharge passage is formed through the fourth surface and formed along an upper part of the middle plate.

10. The fuel cell system as claimed in claim 2, wherein the supply opening is formed through a lower part of the third surface, and the discharge opening is formed through an upper part of the fourth surface.

11. The fuel cell system as claimed in claim 1, wherein the electricity generating unit comprises:
    an anode part having a fuel passageway that is arranged to closely adhere to one of the unit sections of the middle plate to enable fuel supplied to the one of the unit sections to flow through the fuel passageway;
    a cathode part having an air passageway, air flowing through the air passageway; and
    a membrane electrode assembly arranged between the anode part and the cathode part, the reaction of the air and the fuel occurring in the membrane electrode assembly.

12. The fuel cell system as claimed in claim 11, wherein:
    the anode part is formed in a form of a plate and a shape of the anode part is matched with a shape of the one of the unit sections, the fuel passageway having a shape of a zigzag, one end of the fuel passageway being positioned around a region on which one of the inlet openings is formed and another end of the fuel passageway being positioned around another region on which one of the outlet openings is formed; and
    the cathode part is formed in a form of a shape of a plate and a shape of the cathode part is matched with a shape of the one of the unit sections, the air passageway being formed by a plurality of vent holes.

13. The fuel cell system as claimed in claim 1, further comprising:
    a case accommodating the fuel cell body, a side of the case that faces the cathode part having air holes;

a fuel tank storing the fuel; and
a fuel pump supplying the fuel from the fuel tank to the middle plate.

14. A fuel cell system comprising:
a fuel cell body comprising:
   an electricity generating unit that generates electricity by a reaction of air and fuel; and
   a middle plate for supplying the fuel to the electricity generating unit, the middle plate comprising:
      a plurality of unit sections;
      a supply opening for supplying the fuel to a supply passage;
      the supply passage formed inside the middle plate, the supply passage receiving the fuel supplied through the supply opening, a cross-sectional area of the supply passage becoming smaller as the location of the cross-section of the supply passage becomes farther from the supply opening;
      a plurality of inlet openings, each of the inlet openings formed on one of the unit sections, fuel supplied to the supply passage being supplied to the unit sections through the inlet openings, one of the inlet openings, which is located farther from the supply opening than another of the inlet openings, having a smaller opening area than the other of the inlet openings;
      a discharge passage formed inside the middle plate;
      a plurality of outlet openings, each of the outlet openings formed on one of the unit sections, the fuel discharged from the unit sections being discharged to the discharge passage through the outlet openings, a total area of the outlet openings being the same as a total area of the inlet openings, all of the outlet openings having substantially the same opening area; and
      a discharge opening for discharging the fuel from the discharge passage.

15. The fuel cell system as claimed in claim 14, wherein the middle plate is formed in a form of a plate, the middle plate having a first surface and a second surface facing the first surface, the unit sections being formed on the first surface, each of the unit sections being recessed from the first surface, the middle plate having a third surface on which the supply opening is formed, the middle plate having a fourth surface on which the discharge opening is formed.

16. The fuel cell system as claimed in claim 15, comprised of:
   the supply passage formed through the third surface and formed along a lower part of the middle plate; and
   the discharge passage formed through the fourth surface of the middle plate and formed along an upper part of the middle plate.

17. The fuel cell system as claimed in claim 15, wherein the supply opening is formed on a lower part of the third surface of the middle plate, and the discharge opening is formed on an upper part of the fourth surface of the middle plate.

18. The fuel cell system as claimed in claim 15,
   wherein the inlet openings are formed through the first surface in a lower part of the unit sections and are extended along an inside of the middle plate in order to communicate with the supply passage, and the outlet openings are formed through the first surface in an upper part of the unit sections and are extended along an inside of the middle plate in order to communicate with the discharge passage.

19. The fuel cell system as claimed in claim 14, wherein a shape of the cross-section of the supply passage is substantially one of a rectangular or a circular shape.

20. The fuel cell system as claimed in claim 14, wherein the electricity generating unit comprises:
   an anode part having a fuel passageway that is arranged to closely adhere to one of the unit sections of the middle plate to enable fuel supplied to the one of the unit sections to flow through the fuel passageway;
   a cathode part having an air passageway, air flowing through the air passageway; and
   a membrane electrode assembly arranged between the anode part and the cathode part, the reaction of the air and the fuel occurring in the membrane electrode assembly.

21. The fuel cell system as claimed in 20, wherein:
   the anode part is formed in a form of a plate and a shape of the anode part is matched with a shape of the one of the unit sections, the fuel passageway having a shape of a zigzag, one end of the fuel passageway being positioned around a region on which one of the inlet openings is formed and another end of the fuel passageway being positioned around another region on which one of the outlet openings is formed; and
   the cathode part is formed in a form of a plate and a shape of the cathode part is matched with a shape of the one of the unit sections, the air passageway being formed by a plurality of vent holes.

22. The fuel cell system as claimed in claim 14, further comprising:
   a case accommodating the fuel cell body, a side of the case that faces the cathode part having air holes;
   a fuel tank storing the fuel; and
   a fuel pump supplying the fuel from the fuel tank to the middle plate.

* * * * *